United States Patent
Vermeersch et al.

(10) Patent No.: US 11,506,278 B2
(45) Date of Patent: Nov. 22, 2022

(54) DUAL DUROMETER SHIFT BOOT WITH PERFORMANCE SHIELD

(71) Applicant: Steering Solutions IP Holding Corporation, Saginaw, MI (US)

(72) Inventors: Michael C. Vermeersch, Flushing, MI (US); Arthur W. Nellett, Davison, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 17/108,493

(22) Filed: Dec. 1, 2020

(65) Prior Publication Data

US 2021/0164559 A1 Jun. 3, 2021

Related U.S. Application Data

(60) Provisional application No. 62/942,514, filed on Dec. 2, 2019.

(51) Int. Cl.
*F16H 59/02* (2006.01)
*G05G 25/04* (2006.01)

(52) U.S. Cl.
CPC ......... *F16H 59/0213* (2013.01); *G05G 25/04* (2013.01); *F16H 59/0278* (2013.01)

(58) Field of Classification Search
CPC .. F16H 59/02; F16H 59/0213; F16H 59/0278; F16H 59/10; G05G 25/04; B23Q 11/0816; F16J 3/04; F16J 3/041; Y10T 74/2093

See application file for complete search history.

(56) References Cited

U.S. PATENT DOCUMENTS

| | | | | |
|---|---|---|---|---|
| 4,991,457 A | * | 2/1991 | Chen | F16H 59/0213 277/640 |
| 5,335,751 A | * | 8/1994 | Kuroki | B62D 33/073 180/336 |
| 5,450,054 A | * | 9/1995 | Schmersal | F16H 59/044 338/128 |
| 6,234,044 B1 | * | 5/2001 | Sion | B60K 20/06 277/634 |
| 2010/0061795 A1 | * | 3/2010 | Czepczak | B60R 13/0262 403/51 |

FOREIGN PATENT DOCUMENTS

| | | | | |
|---|---|---|---|---|
| CN | 111963670 A | * | 11/2020 | |
| DE | 29615147 U1 | * | 10/1996 | ......... F16H 59/0213 |
| JP | H065244 Y2 | * | 2/1994 | |
| JP | 2003104081 A | * | 4/2003 | |
| JP | 2008273317 A | * | 11/2008 | ......... F16H 59/0213 |

* cited by examiner

*Primary Examiner* — Adam D Rogers
(74) *Attorney, Agent, or Firm* — Dickinson Wright PLLC

(57) ABSTRACT

A vehicle gear shift assembly includes a gear shift lever. The vehicle gear shift assembly also includes a shift boot assembly that at least partially defines an interior section and receives a portion of the gear shift lever therethrough. The shift boot assembly includes a frame. The shift boot assembly also includes a flexible section formed of a material having a first durometer. The shift boot assembly further includes a protective shield operatively coupled to the frame and the flexible section, the protective shield formed of a material having a second durometer that is harder than the first durometer of the flexible section.

4 Claims, 4 Drawing Sheets

DUAL DUROMETER SHIFT BOOT WITH PERFORMANCE SHIELD

CROSS REFERENCE TO RELATED APPLICATION

This application claims priority to U.S. Provisional Patent Application No. 62/942,514, filed Dec. 2, 2019, the disclosure of which is incorporated by reference herein in its entirety.

BACKGROUND

Mechanical shift assembly mechanisms in vehicles require a cosmetic closeout that hides visibility of internal components, while still providing flexibility during the selection of various gear shift positions. Examples of such features include a boot or seal. Cost effective designs include a hard durometer frame that is over-molded by a softer durometer flexible portion and are commonly referred to as "dual durometer." In some cases, the required lever motion and packaging constraints prevent the use of a traditional dual durometer style boot and a more expensive leather or cloth material is forced to be utilized.

SUMMARY OF THE DISCLOSURE

According to one aspect of the disclosure, a vehicle gear shift assembly includes a gear shift lever. The vehicle gear shift assembly also includes a shift boot assembly that at least partially defines an interior section and receives a portion of the gear shift lever therethrough. The shift boot assembly includes a frame. The shift boot assembly also includes a flexible section formed of a material having a first durometer. The shift boot assembly further includes a protective shield operatively coupled to the frame and the flexible section, the protective shield formed of a material having a second durometer that is harder than the first durometer of the flexible section.

According to another aspect of the disclosure, a shift boot assembly for a vehicle shift lever is provided. The shift boot assembly includes a frame. The shift boot assembly also includes a flexible section formed of a material having a first durometer, the flexible section have an inner surface and an outer surface. The shift boot assembly further includes a protective shield operatively coupled to the frame and in contact with the inner surface of the flexible section, the protective shield formed of a material having a second durometer that is harder than the first durometer of the flexible section, wherein the protective shield includes a channel.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 2:
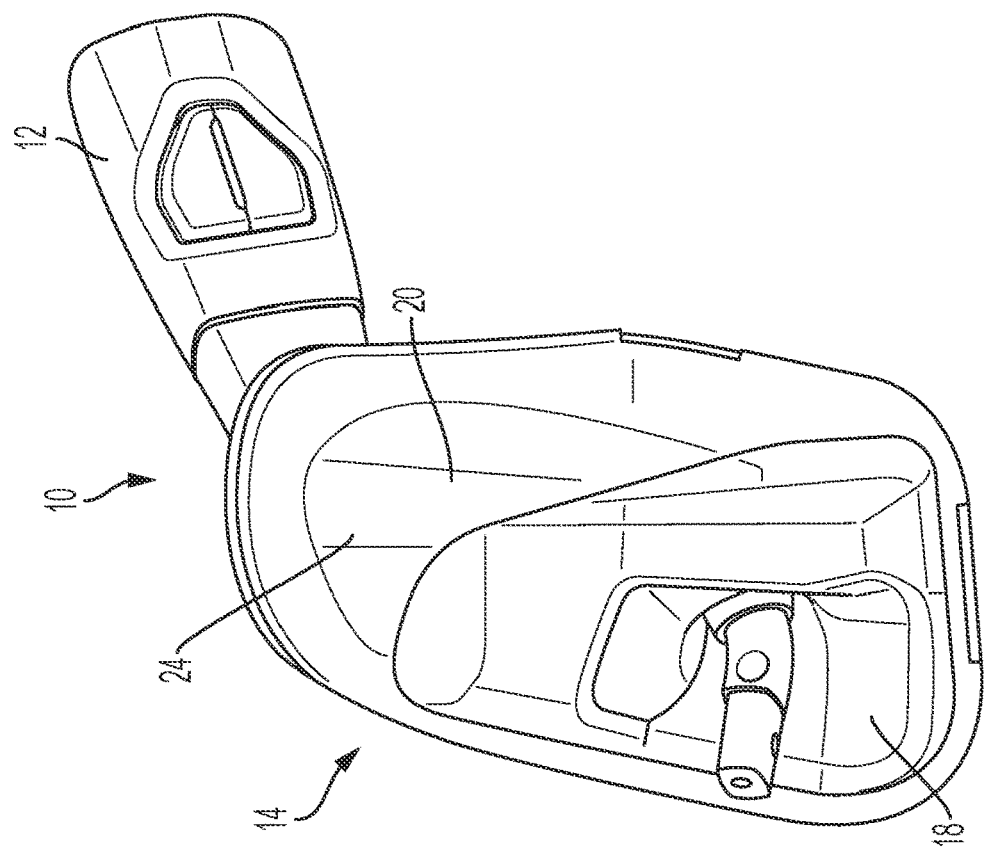
FIG. 2 is a perspective view of the vehicle gear shift assembly from a second side.
Figure 1:
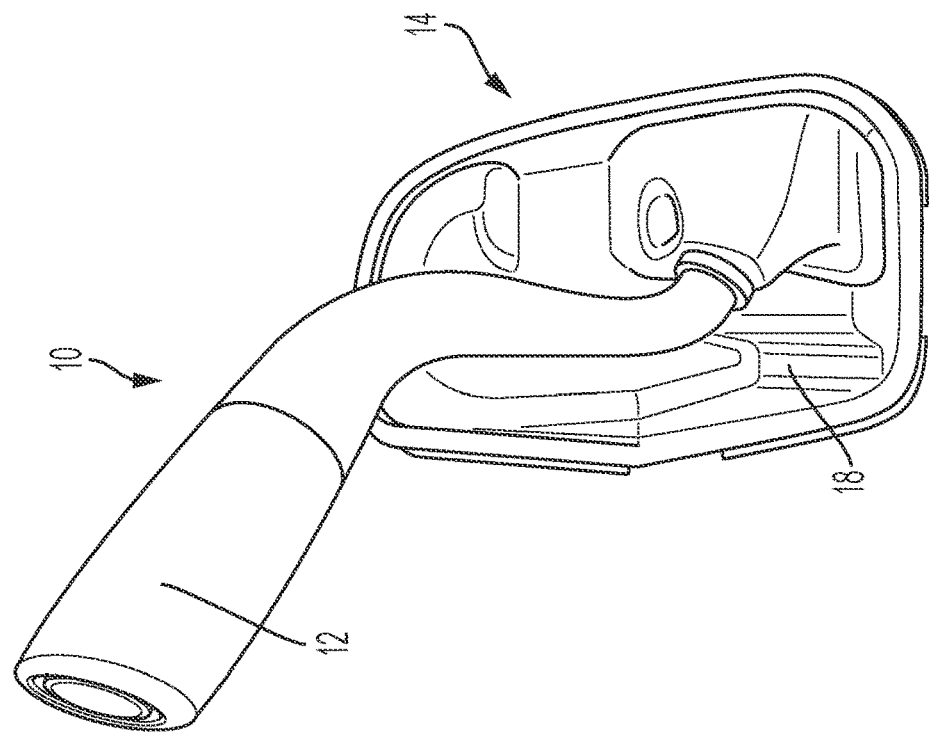
FIG. 1 is a perspective view of a vehicle gear shift assembly from a first side.

Referring now to the Figures, where the invention will be described with reference to specific embodiments, without limiting same, various embodiments of the invention disclosed herein are shown.

A vehicle gear shift assembly is shown in various views and is generally referenced with numeral 10. The vehicle gear shift assembly 10 includes a gear shift lever 12 that is moveable between multiple positions to control the transmission gear that the vehicle is operating in, and to place the vehicle in other conditions, such as reverse or park, for example.

The vehicle gear shift assembly 10 includes a shift boot assembly 14 that the gear shift lever 12 passes through. The shift boot assembly 14 partially defines an interior section 16 of the vehicle gear shift assembly 10 that contains various internal components associated with the functionality of the vehicle gear shift assembly 10. The shift boot assembly 14 hides the visibility of the interior section 16, prevents interaction with the interior section 16 by an operator, and at least partially seals the interior section 16 from debris.

The shift boot assembly 14 includes a flexible section 18 that is formed of a first material. The first material is any suitable material having a durometer low enough to accommodate movement of the gear shift lever 12 during movement between various operational positions. The shift boot assembly 14 also includes a protective shield 20 that is formed of a second material. The second material is a material having a durometer greater than the durometer of the first material. In other words, the protective shield 20 is harder than the flexible section 18. In some embodiments, the protective shield 20 is a rigid material, while semi-rigid materials are contemplated for other embodiments.

Figure 3:
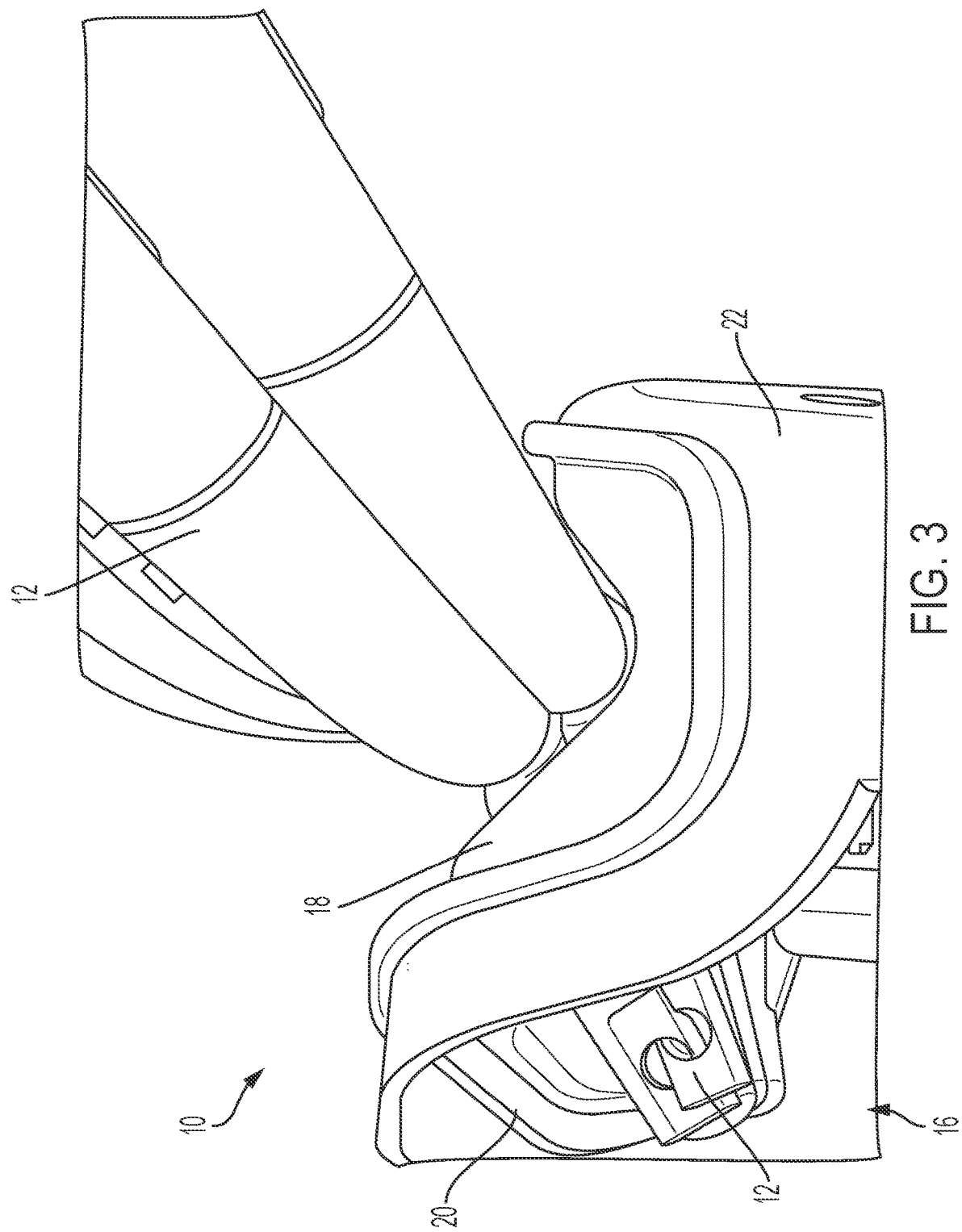
FIG. 3 is a perspective view of a shift boot assembly of the vehicle gear shift assembly.
Figure 5:
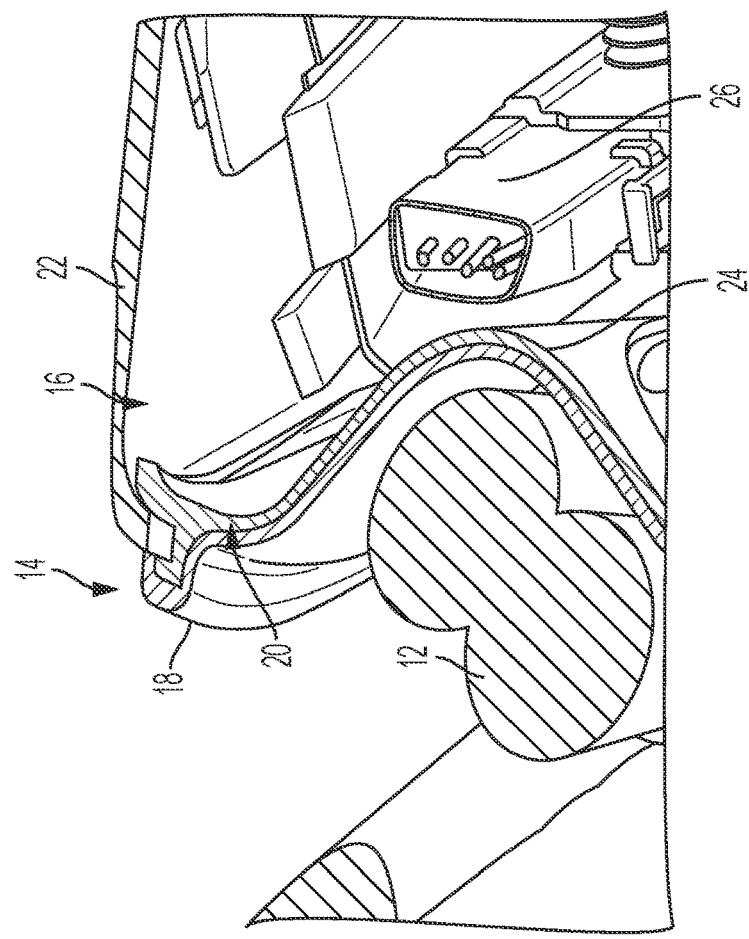
FIG. 5 is a partial cross-sectional view of the shift boot assembly.
Figure 4:
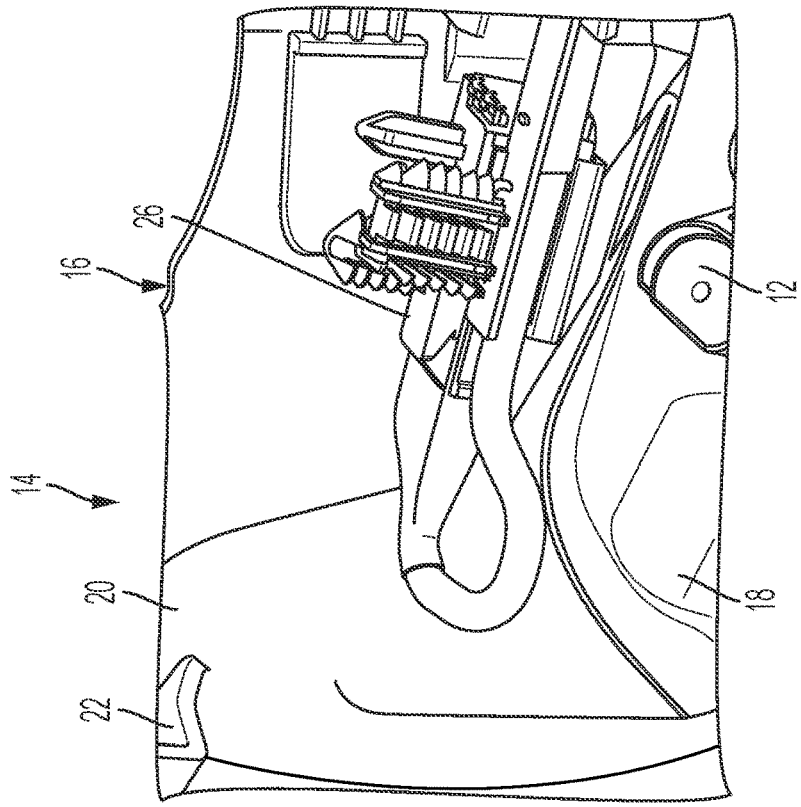
FIG. 4 is another perspective view of the shift boot assembly.

The flexible section 18 and the protective shield 20 are operatively coupled to a frame 22 of the vehicle gear shift assembly 10, as shown in FIGS. 3-5. The frame 22 is formed of a hard durometer material. The protective shield 20 is directly coupled to the frame 22 in the illustrated embodiments. The protective shield 20 is placed strategically in locations of the frame 22 that control and protect the material flow of the flexible section 18 during movement of the gear shift lever 12. The protective shield 20 may cover any amount of surface area of an inner surface of the flexible section 18. In some embodiments, the protective shield 20 covers over half of the surface area of the inner surface of the flexible section 18, but this is merely an example and it is to be appreciated that a larger or smaller percentage of the inner surface of the flexible section 18 may be covered by the protective shield 20.

In operation, during movement of the gear shift lever 12, the flexible section 18 moves in response to movement of the gear shift lever 12. This movement may cause binding or other undesired material flow of the flexible section 18. However, the protective shield 20 is located to prevent the flexible section 18 from migrating against components disposed in the interior section 16. This control is at least partially provided by a substantially V-shaped or U-shaped channel 24 of the protective shield 20 when shifting into a Park position, as shown well in FIGS. 2 and 5. Additionally, the protective shield 20 prevents material flow of the flexible section 18 against an internal wire harness and connector 26, as shown in FIGS. 4 and 5. In addition to the above-described movement control, the protective shield 20 provides enhancement for theft deterrent access to a BTSI solenoid override.

Figure 8:
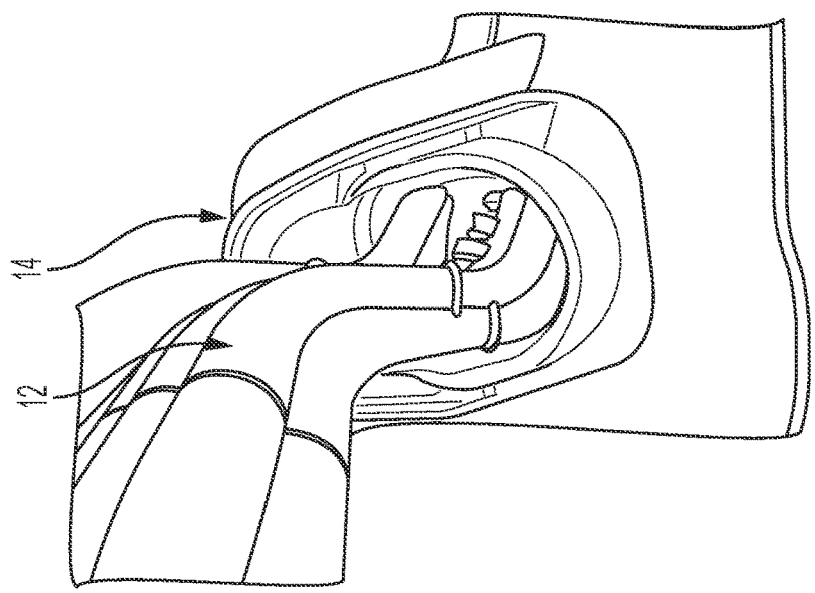
FIG. 8 is a perspective view of the assembly according to another aspect of the disclosure.
Figure 7:
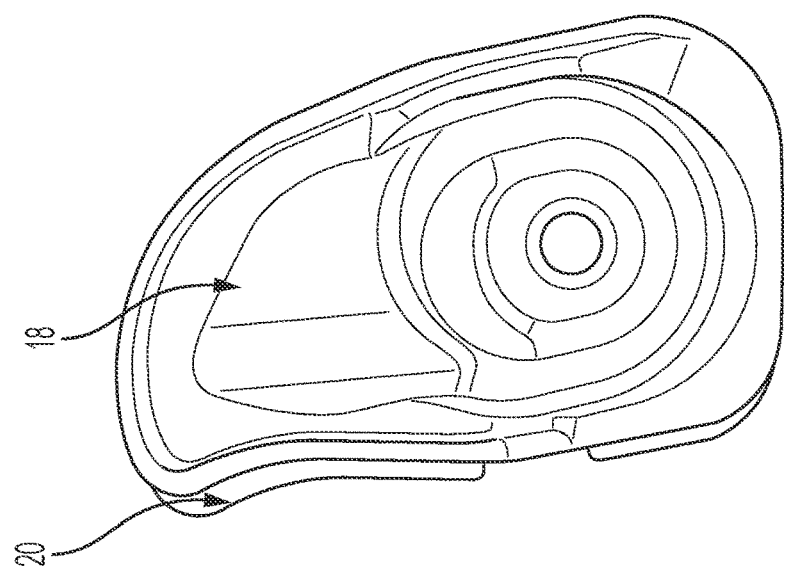
FIG. 7 is a perspective view of the shift boot assembly from a second side of the assembly shown in FIG. 6.
Figure 6:
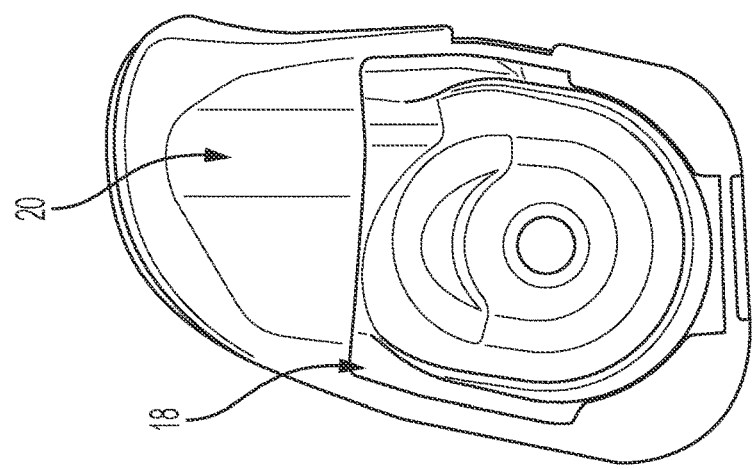
FIG. 6 is a perspective view of shift boot assembly from a first side according to another embodiment of the assembly.

Referring now to FIGS. 6-8, another geometry of the protective shield 20 is shown. The protective shield 20 may be customized to be positioned against different regions of the flexible section 18 to dictate the movement properties of the flexible section 18.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A vehicle gear shift assembly comprising:
   a gear shift lever; and
   a shift boot assembly that at least partially defines an interior section and receives a portion of the gear shift lever therethrough, the shift boot assembly comprising:
   a flexible section; and
   a protective shield positioned to be in contact with an inner surface of the flexible section, the protective shield having a channel that the gear shift lever is positioned within.

2. The vehicle gear shift assembly of claim 1, wherein the flexible section is formed of a material having a first durometer and the protective shield is formed of a material having a second durometer that is harder than the first durometer of the flexible section.

3. The vehicle gear shift assembly of claim 1, wherein the channel is V-shaped.

4. The shift boot assembly of claim 1, wherein the channel is U-shaped.

* * * * *